United States Patent
Walker et al.

(10) Patent No.: US 10,996,511 B1
(45) Date of Patent: May 4, 2021

(54) CURVED BACKLIGHT AND SYSTEM FOR STRAY LIGHT CONTROL

(71) Applicant: Rockwell Collins, Inc., Cedar Rapids, IA (US)

(72) Inventors: Brian W. Walker, Cedar Rapids, IA (US); Albert N. Stuppi, Springville, IA (US); Clint L. Gosch, Cedar Rapids, IA (US); Ricky J. Johnson, Shellsburg, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/889,580

(22) Filed: Jun. 1, 2020

Related U.S. Application Data

(63) Continuation of application No. 16/367,824, filed on Mar. 28, 2019, now Pat. No. 10,705,380, which is a continuation-in-part of application No. 16/015,277, filed on Jun. 22, 2018, now Pat. No. 10,649,275.

(51) Int. Cl.
*G02F 1/1335* (2006.01)
*G02F 1/13357* (2006.01)
*G02B 27/30* (2006.01)
*G02F 1/1333* (2006.01)

(52) U.S. Cl.
CPC ....... *G02F 1/133606* (2013.01); *G02B 27/30* (2013.01); *G02F 1/133305* (2013.01); *G02F 1/133308* (2013.01); *G02F 1/133526* (2013.01)

(58) Field of Classification Search
None
See application file for complete search history.

(56) References Cited

U.S. PATENT DOCUMENTS

| | | | |
|---|---|---|---|
| 9,644,816 B1 | 5/2017 | Barnidge et al. | |
| 2006/0139953 A1* | 6/2006 | Chou | G02B 3/08 362/613 |
| 2012/0038751 A1* | 2/2012 | Yuan | H04N 5/23232 348/51 |
| 2016/0077380 A1* | 3/2016 | Wu | G02F 1/133603 349/62 |
| 2016/0103364 A1* | 4/2016 | Nam | G02F 1/133603 349/69 |
| 2018/0359461 A1* | 12/2018 | Koerber | H04N 13/349 |

* cited by examiner

*Primary Examiner* — Phu Vu
(74) *Attorney, Agent, or Firm* — Suiter Swantz pc llo

(57) ABSTRACT

A display including a curved backlight and system for stray light control is disclosed. In embodiments, the curved backlight includes a curved substrate and an array of light sources disposed on the curved substrate, collimating optics, and a diffuser. The array of light sources includes a first group of light sources and a second group of light sources. The collimating optics are arranged to receive and collimate light only from the first group of light sources. The diffuser is arranged to receive and diffuse the collimated light from the collimating optics and light from the second group of light sources. The display further includes a liquid crystal layer arranged to receive light generated by the array of light sources and to display an image. The display further includes a controller configured to control the array of light sources such that at least some of the light sources emit light.

9 Claims, 17 Drawing Sheets

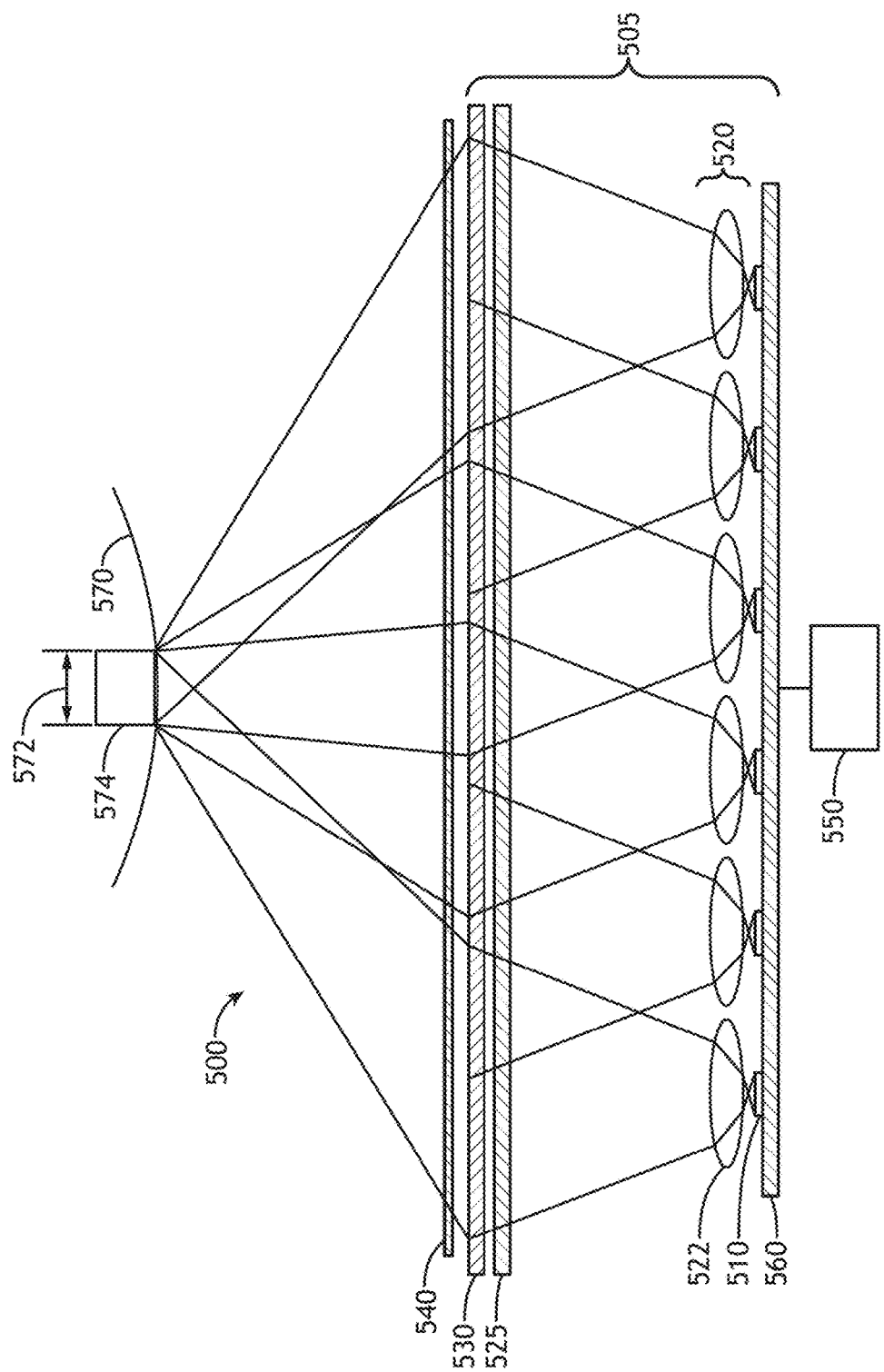

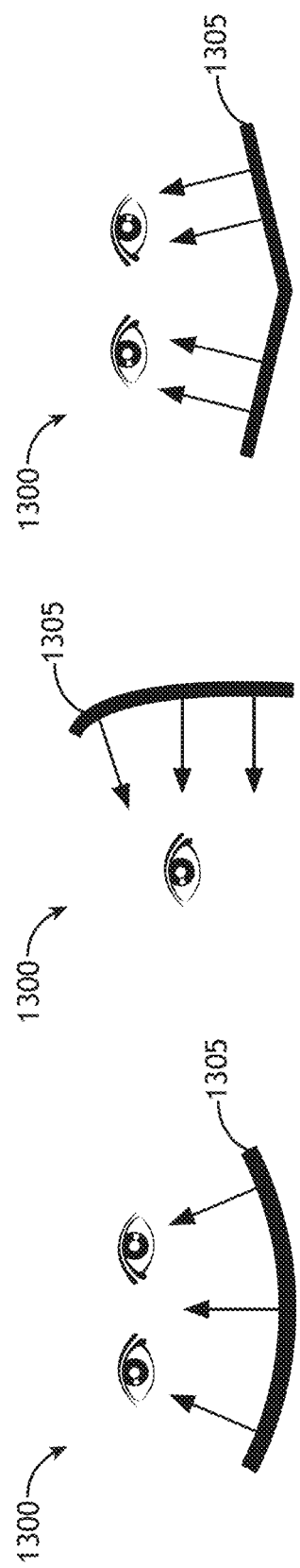

CURVED BACKLIGHT AND SYSTEM FOR STRAY LIGHT CONTROL

CROSS-REFERENCE TO RELATED APPLICATION

The present application is a continuation of U.S. patent application Ser. No. 16/367,824, filed Mar. 28, 2019, entitled CURVED BACKLIGHT AND SYSTEM FOR STRAY LIGHT CONTROL, naming Brian W. Walker, Albert N. Stuppi, Clint L. Gosch, and Ricky J. Johnson as inventors, which is a continuation-in-part (CIP) of U.S. patent application Ser. No. 16/015,277, filed Jun. 22, 2018, entitled BACKLIGHT AND DISPLAY FOR STRAY LIGHT CONTROL, naming Rick J. Johnson and Albert N. Stuppi as inventors, which are each incorporated herein by reference in its entirety.

BACKGROUND

Aircraft typically have displays to be seen by the aircraft pilot and other passengers of the aircraft. A pilot may be limited in moving their head within a headbox, and thus views the display within a certain angular range (viewing envelope). Thus, the pilot may view the display only within a viewing angular range. Additionally, stray light from displays can cause distracting reflections from windscreens, such as cockpit canopies. Canopy reflection may be an even greater concern during night time operations, as these reflections may obscure the pilot's vision of the space outside of the canopy, thereby reducing situational awareness. On the other hand, stray light is typically less of a problem during daytime viewing. Furthermore, because geometry and space constraints vary among cockpits, previous approaches designed to address these issues, including polarization and/or modification of backlight candela distributions, may be incompatible with certain aircraft geometries.

SUMMARY

A display including a curved backlight and system for stray light control is disclosed. In one or more embodiments, the curved backlight includes a curved substrate, an array of light sources disposed on the curved substrate, collimating optics, and a diffuser. The array of light sources may include a first group of light sources and a second group of light sources. The collimating optics may be arranged to receive and collimate light from the first group of light sources, but not the second group of light sources. In one or more embodiments, the diffuser may be arranged to receive and diffuse the collimated light, directed normal to the diffuser, from the collimating optics and light from the second group of light sources. In one or more embodiments, the display further includes a liquid crystal layer arranged to receive light generated by the array of light sources and to display an image. In one or more embodiments, the display further includes a controller configured to control the array of light sources such that at least some of the light sources emit light.

In some embodiments of the display, the display further includes at least one light control layer configured to receive light from the curved backlight and restrict light having an angular profile.

In some embodiments of the display, the at least one light control layer includes at least one micro-louver film portion.

In some embodiments of the display, the collimating optics includes an array of lenses, corresponding to the lenses arranged to collimate light from the first group of light sources, wherein each light source of the first group is arranged at a respective focal point of a corresponding lens of the array of lenses, and no light sources of the second group are arranged at any focal point of a lens of the array of lenses.

In some embodiments of the display, the array of light sources includes an array of light emitting diodes.

In some embodiments of the display, the diffuser includes a holographic diffuser.

In some embodiments of the display, the collimating optics includes at least one of spherical lenses or cylindrical lenses.

In some embodiments of the display, the display further includes the substrate supporting the array of light sources.

In some embodiments of the display, the substrate includes a printed wiring board.

In some embodiments of the display, the controller is further configured to control the array of light sources such that only the first group of light sources emit light.

In some embodiments of the display, the controller is further configured to control the array of light sources such that the first group of light sources emit light.

In some embodiments of the display, the second group of light sources includes a third group of light sources in a peripheral region of the array and a fourth group of light source in an inner region of the array within the peripheral region wherein the controller is configured to control the array of light sources such that the first and third group of light sources emit light, but not the fourth group of light sources.

A display including a curved backlight and system for stray light control is disclosed, in accordance with one or more additional embodiments of this disclosure. In one or more embodiments, the curved backlight includes an array of light sources disposed on a curved substrate, refracting optics arranged to receive and diverge light from the array of light sources, a Fresnel lens arranged to receive the diverged light from the refracting optics and to converge the diverged light to provide converged light within a predetermined size at a focal plane, and a diffuser configured to receive the light from the Fresnel lens and diffuse the light. The display further includes a liquid crystal layer configured to receive the light generated by the array of light sources, wherein the liquid crystal layer is configured to transmit the light through the liquid crystal layer to display an image on a surface of the liquid crystal layer.

In some embodiments of the display, the display further includes at least one light control layer configured to receive light from the curved backlight and restrict light having an angular profile.

In some embodiments of the display, the at least one light control layer includes at least one micro-louver film portion.

In some embodiments of the display, the refracting optics includes an array of lenses corresponding to the array of light sources.

In some embodiments of the display, the array of light sources includes an array of light emitting diodes.

In some embodiments of the display, the diffuser includes a holographic diffuser.

In some embodiments of the display, the collimating optics include at least one of a spherical lens or a cylindrical lens.

In some embodiments of the display, the substrate includes a printed wiring board.

In some embodiments of the display, the controller is configured to control the array of light sources such that only the first group of light sources emit light.

In some embodiments of the display, the second group of light sources includes a third group of light sources in a peripheral region of the array and a fourth group of light source in an inner region of the array within the peripheral region wherein the controller is configured to control the array of light sources such that the first and third group of light sources emit light, but not the fourth group of light sources.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are provided for example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 5A is a schematic diagram of a display with a Fresnel lens, in accordance with one or more embodiments of the present disclosure;

FIG. 13A illustrates a display with a curved backlight having a substantially semicircular curvature cross-section across a horizontal axis, in accordance with one or more embodiments of the present disclosure;

FIG. 13B illustrates a display with a curved backlight having a variable (e.g., flared) curvature cross-section along a vertical axis, in accordance with one or more embodiments of the present disclosure;

FIG. 13C illustrates a display with a curved backlight having an angled curvature cross-section having one or more substantially straight portions that meet at an angle along a horizontal axis, in accordance with one or more embodiments of the present disclosure.

DETAILED DESCRIPTION

Figure 1:
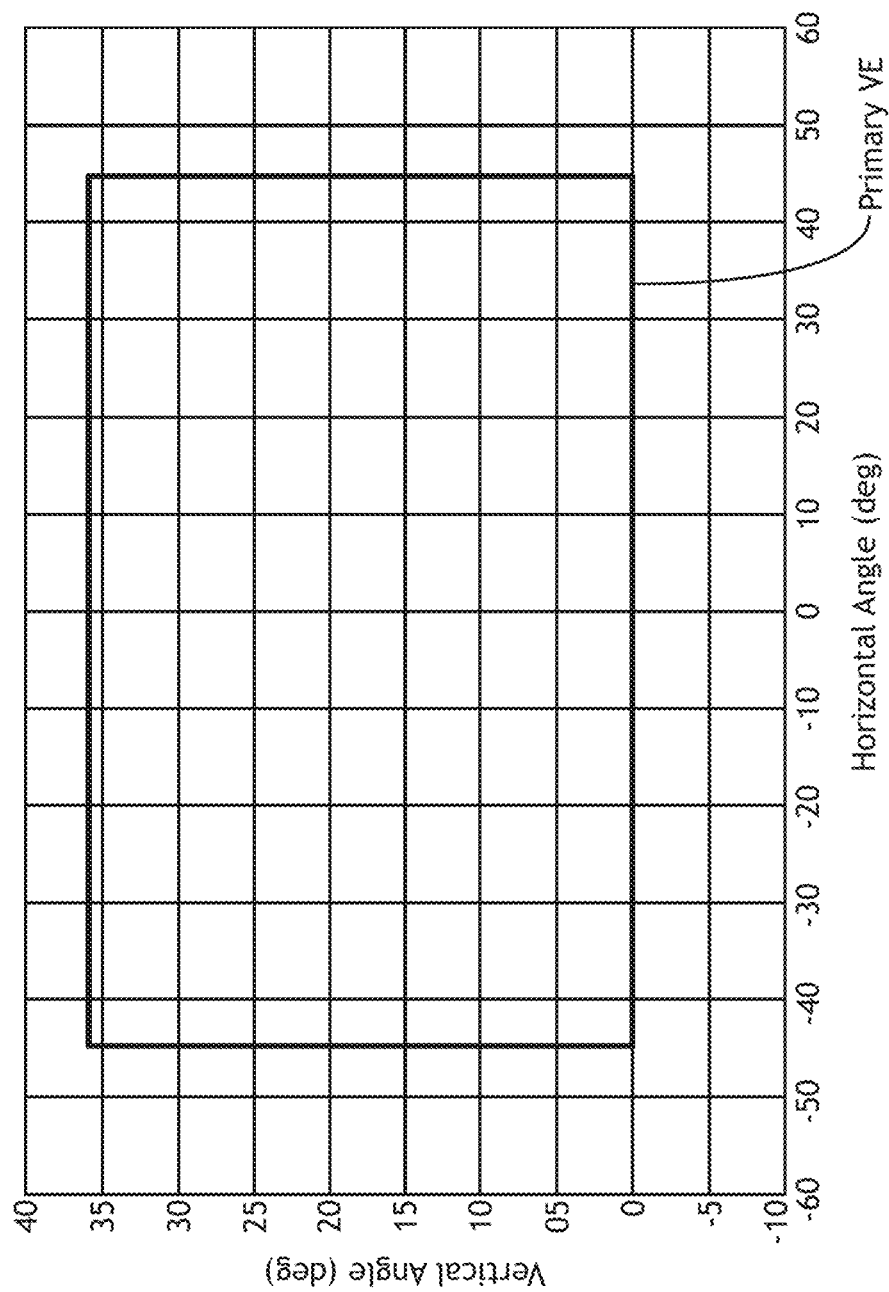
FIG. 1 illustrates a viewing angular range for a viewing arrangement, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

As noted previously herein, stray light from aircraft cockpit displays can cause distracting reflections from windscreens, such as cockpit canopies. Canopy reflection may be an even greater concern during night time operations, as these reflections may obscure the pilot's vision of the space outside of the canopy, thereby reducing situational awareness. On the other hand, stray light is typically less of a problem during daytime viewing. Additionally, the geometry and space constraints vary among cockpits. Thus, certain adjustments designed to address these issues, including polarization and/or modification of backlight candela distributions, may be incompatible with certain aircraft geometries.

Accordingly, embodiments of the present disclosure are directed to curing one or more of the shortfalls of the previous approaches identified above. Broadly, embodiments of the present disclosure are directed to a display configured to minimize unwanted reflections on the display. Embodiments of the present disclosure are directed to a display wherein only a subset of an array of light sources are collimated and directed normal to a diffuser. Additional embodiments of the present disclosure are directed to a display including refracting optics configured to receive and diverge light from an array of light sources. Further embodiments of the present disclosure are directed to a display including a curved backlight configured to direct light from the display to a viewer in such a manner as to minimize unwanted reflections.

Embodiments of the inventive concepts disclosed herein regarding a display with two groups of light sources, a first group where the light is collimated and directed normal to a diffuser, and a second group where the light is not collimated but directed to the diffuser, provide for an increased flexibility in controlling the direction and viewing angular range of the light emitted from the display, while at the same time reducing stray light. The light from the display may be controlled by controlling whether light is emitted from the light sources of the groups.

In the case that the diffuser is low scattering, and provides some directionality of the light impinging on the diffuser, the light may be controlled to reduce light outside the viewing angular range of the display relative to a user, such as an aircraft pilot. Stray light reflections may be reduced. The display brightness for a given power applied to the display may be reduced. Thus, power savings is achieved as well as increased display brightness. Further, the display light may be maintained within the viewing angular range, while reducing light outside the viewing angular range.

Moreover, according to embodiments of the present disclosure disclosed herein regarding an array of light sources, corresponding lens array, and Fresnel lens, light from the display may be converged within a predetermined size to stay within a headbox. This allows for a more tailored headbox. The placement of the Fresnel lens allows for control of light near a liquid crystal layer and does not impact the uniform illumination of the liquid crystal layer. The inclusion of the Fresnel lens provides design flexibility.

The term collimated light herein includes substantially collimated light, which need not be perfectly collimated. Further, the term collimated optics and collimated lens includes any optical element arranged to reduce the divergence of light from the source.

FIG. 1 illustrates a viewing angular range for a viewing arrangement, in accordance with one or more embodiments of the present disclosure. More particularly, FIG. 1 illustrates a viewing angular range for a primary viewing angular range (e.g., primary viewing envelope (VE)). The primary viewing angular range is shown bounded by a solid line. As can be seen, the viewing angular range is expressed in terms of a horizontal viewing angle range and a vertical viewing angle range.

In general, the viewing angular range will depend on the relative position of the viewer and the display. In an environment where the viewer is a pilot of an aircraft, the viewing angular range may depend on the particular aircraft.

Figure 2A:
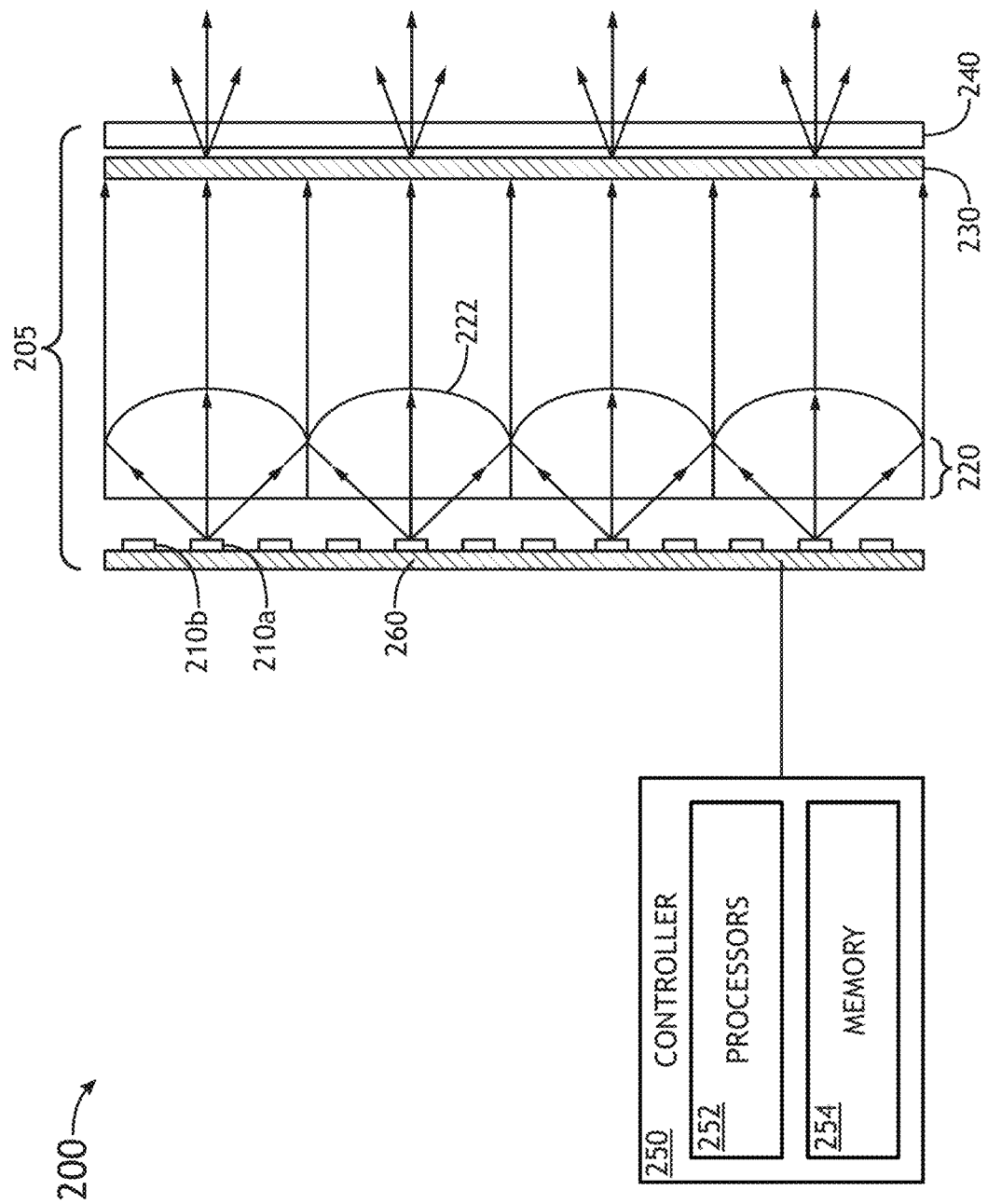
FIG. 2A is a schematic of a display, in accordance with one or more embodiments of the present disclosure.

FIG. 2A is a schematic of a display 200, in accordance with one or more embodiments of the present disclosure. The display 200 may include, but is not limited to, an array of light sources 210 (light sources 210a and 210b), collimating optics 220, a diffuser 230 and a liquid crystal layer 240, and a controller 250. The substrate 260, light sources 210, collimating optics 220, and diffuser 230 together make up a backlight 205.

The light sources 210 may be arranged on the substrate 260 to support the light sources 210. The substrate 260 may be, for example, a printed wiring board (PWB).

The light sources 210 may be, for example, sources of white light. For example, the light sources 210 may be light emitting diodes (LEDs), organic light emitting diodes (OLEDs), other types of white light sources, and the like.

The light sources 210 may include two groups of light sources. For example, light sources 210 may include a first group of light sources 210a and a second group of light sources 210b. The first group of light sources 210a may be arranged relative to the collimating optics 220 such that light from the light sources 210a are collimated and directed normal to the diffuser 230. The second group of light sources 210b may be arranged such the collimating optics 220 do not collimate the second group of light sources 210b, and the light from the second group of light sources 210b impinging on the diffuser 230 is not collimated.

Figure 2B:
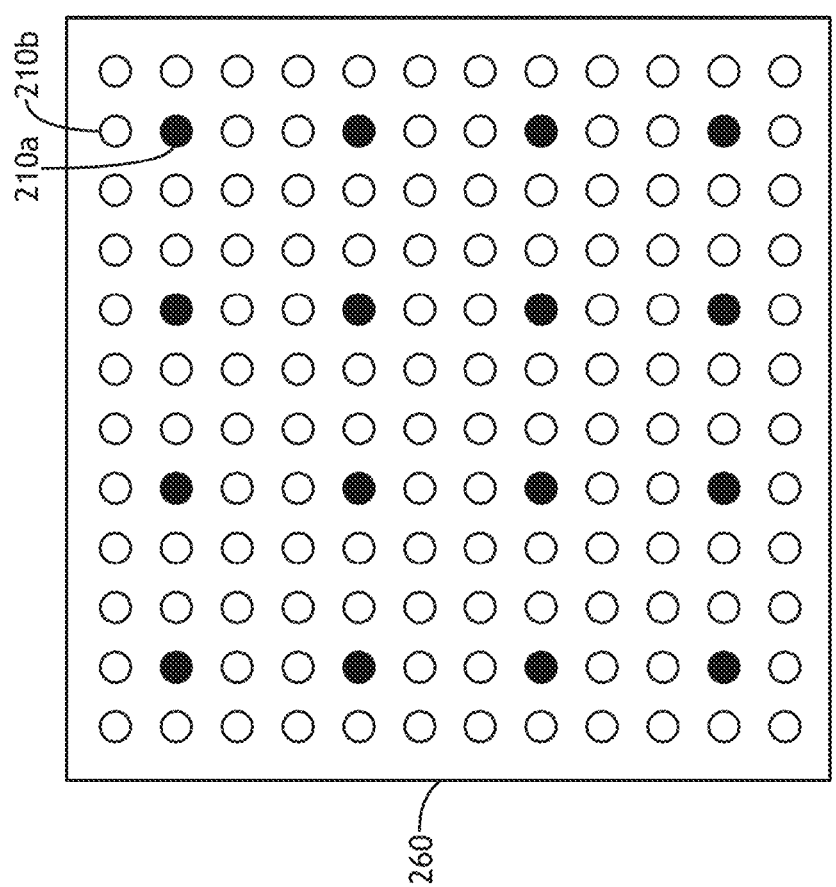
FIG. 2B is a top view of the arrangement of light sources of a display, in accordance with one or more embodiments of the present disclosure.

FIG. 2B is a top view of the arrangement of light sources 210 of a display 200, in accordance with one or more embodiments of the present disclosure. As noted previously herein, the light sources 210 may include a first group of light sources 210a and a second group of light sources 210b. The light sources 210a are shown by dark circles, while the light sources 210b are shown by open circles.

The collimating optics 220 may include an array of lenses 222. For example, the lenses 222 may be spherical or cylindrical lenses. The lenses 222 may be other than spherical or cylindrical, and may have a surface defined by a function, such as a polynomial. The array of lens 222 may be formed with any material known in the art including, but not limited to, plastic, glass, and the like. The lenses 222 may have a variety of cross-section shapes. For example, lenses 222 may include cross-sections in the shape of a square, rectangle, or the like. The collimating optics 220 may be other than an array of lens, and may include refractive and/or reflective elements. The lenses 222 may be arranged relative to the first group of light sources 210a such that each of the light sources 210a is arranged at a focal point of a respective lens of the lenses 222. Further, the lenses 222 may be arranged relative to the second group of light sources 210b such that no light sources 210b are arranged at any focal point of a lens 222 of the array of lenses 222.

The diffuser 230 is arranged to receive and diffuse the collimated light, directed normal to the diffuser 230, from the collimating optics 220. Thus, the diffuser 230 receives collimated light originating from the first group of light sources 210a which is collimated by the collimating optics 220 and directed to the diffuser 230. The diffuser 230 further receives light from the second group of light sources 210b which is not collimated and diffuses that light. The diffuser 230 may provide sufficient diffusion such that the collimating optics 220 and the light sources 210 are not visible when viewing the display 200.

The diffuser 230 may be a low diffusion diffuser such that light is not significantly scattered beyond what is needed to mask the collimating optics 220 and the light sources 210. A low diffusion diffuser may be, for example, a holographic diffuser. The low diffusion diffuser reduces the amount of light from the first group of light sources 210a which is scattered, and thus reduces the amount of stray light due to light scattering.

The low diffusion diffuser 230 provides for a narrower light distribution for collimated light impinging normal to the diffuser 230, as compared to uncollimated light impinging on the diffuser 230. In particular, the low diffusion diffuser is such that the collimated light directed normal to the diffuser 230 and originating from the first group of light sources 210a, which collimated light is not scattered, provides a light distribution pattern which is relatively narrow in angular range. On the other hand, the light originating from the second group of light sources 210b which is not scattered provides a light distribution pattern which is relatively larger in angular range because the light from second group is not collimated by the collimating optics 220. Thus, the low diffusion diffuser 230 may reduce the amount of light which is directed out of the viewing angular range at least for collimated light impinging normal to the low diffusion diffuser 230. Thus, controlling the light sources 210 such that the first group of light sources 210a emit light, but the second group of light sources 210b does not emit light provides for a light distribution pattern that is relatively narrow in angular range.

The liquid crystal layer 240 receives light from the diffuser 230 and provides an image which may be viewed by a viewer (e.g., pilot). The liquid crystal layer 240 may include liquid crystal material, regions of which may be transparent or opaque based on an appropriate voltage being applied to the regions of the liquid crystal material. The liquid crystal layer 240 may further include color filters (not shown) if the display is a color display.

The controller 250 may include a processor 252 and a memory 254, for example. The processor 252 performs certain functions, for example, based on software in the memory 254. The controller 250 is configured to control the array of light sources 210 such that at least a subset of the array of light sources 210 emits light. For example, as shown in FIG. 2A, only the first group of light sources 210a may be controlled to emit light, while the second group of light sources 210b are controlled such that they do not emit light.

As shown in FIG. 2A, the controller 250 may be configured to control the array of light sources 210 such that only the first group of light sources 210a emit light. As mentioned above, controlling the light sources 210 such that the first group of light sources 210a emit light, but the second group of light sources 210b do not emit light provides for a light distribution pattern that is relatively narrow in angular range. At the same time the diffuser 230 provides diffused light sufficient to provide a uniform light background that masks the light sources 210 and the collimating optics 220. This arrangement is appropriate for night time operation where stray light outside the viewing angular range may be an issue.

Figure 3:
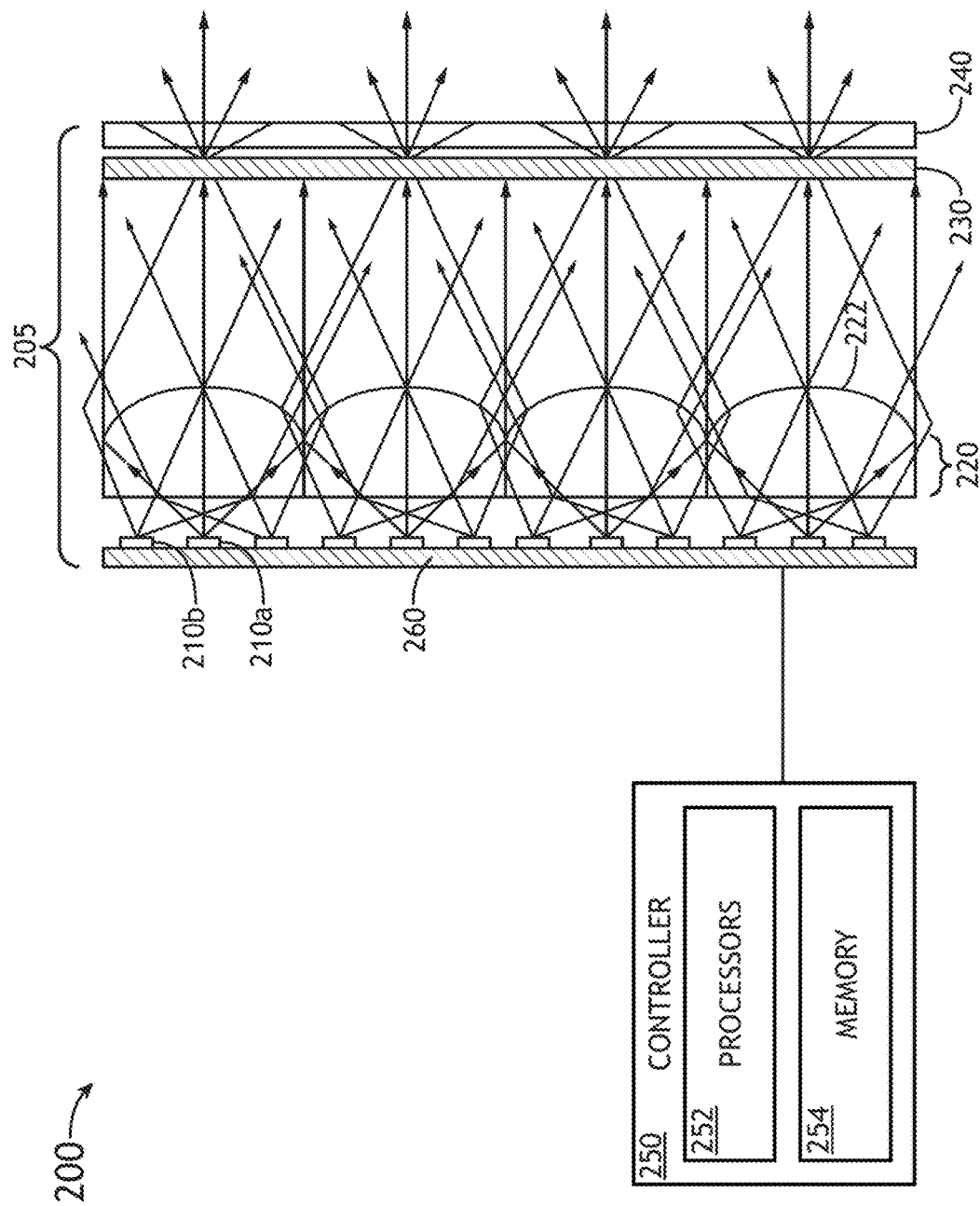
FIG. 3 illustrates a display with an arrangement of light sources where each light source is controlled to emit light, in accordance with one or more embodiments of the present disclosure.

FIG. 3 illustrates a display 200 with an arrangement of light sources 210 where each light source 210 is controlled to emit light, in accordance with one or more embodiments of the present disclosure. It is noted herein that FIG. 3 is similar to FIG. 2A, except that in FIG. 3 all of the light sources 210a and 210b are controlled by the controller 250 to emit light. As discussed above, the second group of light sources 210b provide a relatively wider light distribution. Thus, the arrangement of FIG. 3 may be appropriate for environments where a wider light distribution outside of the diffuser 230 is acceptable, such as when light outside the viewing angular range is acceptable. For example, a wider light distribution may be acceptable in daytime operations, when reflections on the display 200 are less of a concern. Further, it is contemplated herein that controlling the light sources (via controller 250) such that both light sources 210a and light sources 210b may provide for a display 200 with increased brightness. Such increased display brightness is appropriate for daytime operations.

Figure 4A:
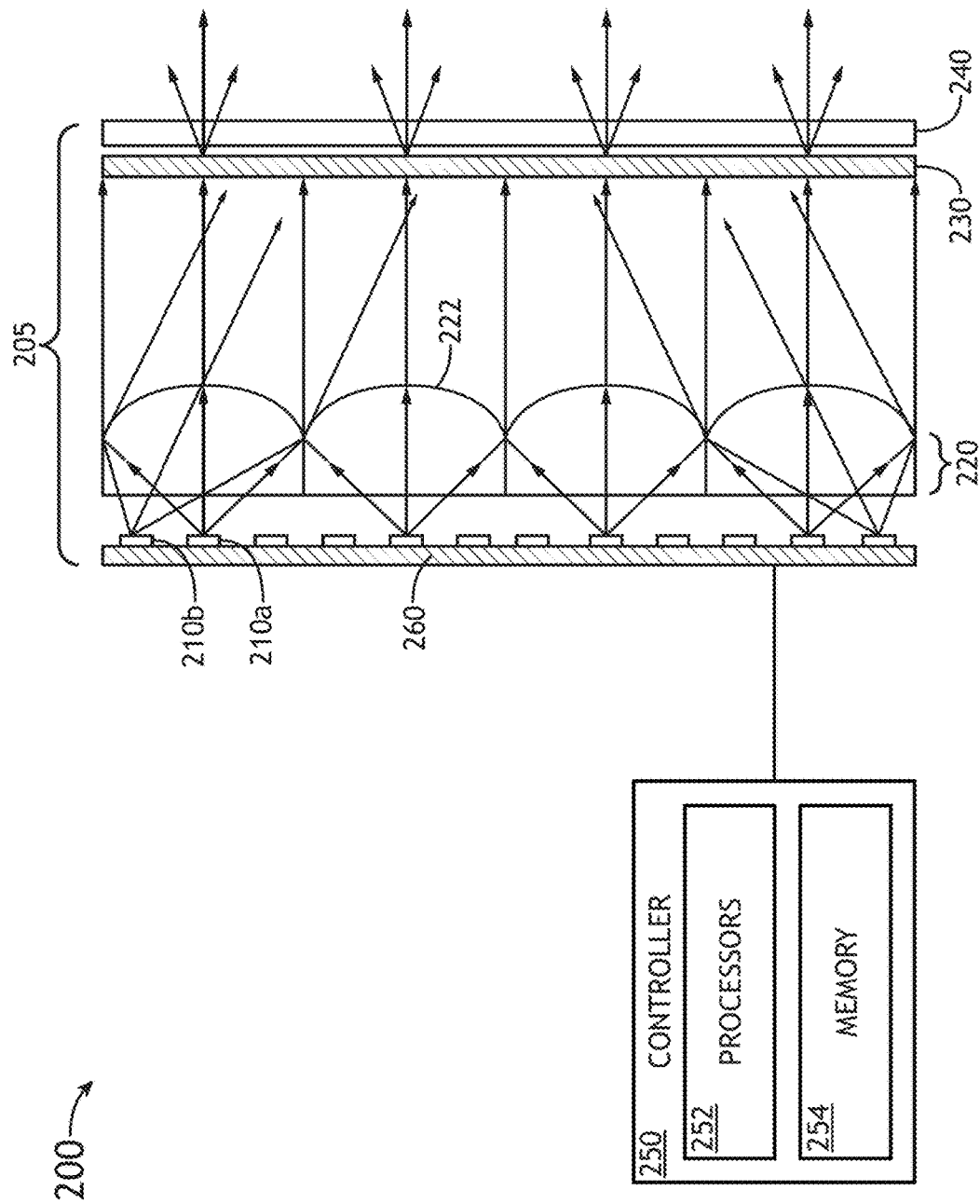
FIG. 4A illustrates a display with an arrangement of the light sources where light sources in the periphery of the display are controlled to emit light, in accordance with one or more embodiments of the present disclosure.
Figure 4B:
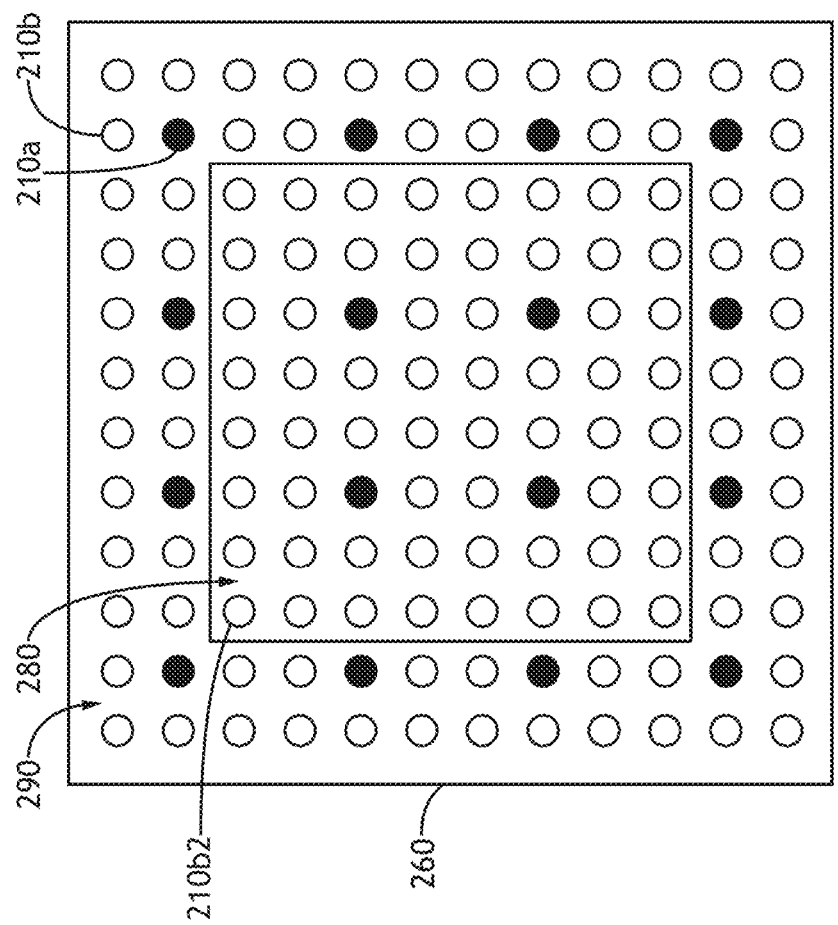
FIG. 4B is a top view of the arrangement of light sources of a display, in accordance with one or more embodiments of the present disclosure.

FIG. 4A illustrates a display 200 with an arrangement of the light sources 210 where light sources 210 in the periphery of the display 200 are controlled to emit light, in accordance with one or more embodiments of the present disclosure. FIG. 4B is a top view of the arrangement of light sources 210 of a display 200, in accordance with one or more embodiments of the present disclosure.

More particularly, FIGS. 4A and 4B illustrate an arrangement where the second group of light sources 210b includes a third group of light sources 210b1 and a fourth group of light sources 210b2. FIG. 4A is similar to FIG. 3, except for the particular light sources 210 that are controlled by the controller 250 to emit light. The third group of light sources 210b1 are arranged in a peripheral region 290 of the array of light sources 210, while the fourth group of light sources 210b2 are arranged in an inner region 280 of the array within the peripheral region 290.

FIG. 4B is a top view showing the arrangement of the first group of light sources 210a and the second group of light sources 210b1, 210b2 for control as provided in FIG. 4A. The light sources 210a are shown by dark circles, while the light sources 210b1, 210b2 are shown by open circles.

In the arrangement of FIGS. 4A and 4B, the controller 250 is configured to control the array of light sources 210 so that the first group of light sources 210a emit light. The controller 250 is further configured to control the array of light sources 210 so that the third group of light sources 210b1 in the peripheral region 290 emit light, and to control the fourth group of light sources 210b2 arranged in the inner region 280 so that they do not emit light.

Controlling the third group of light sources 210b1 in the peripheral region 290 to emit light allows for light from the third group of light sources 210b1 to be directed back to a viewer of the display 200, and more light may be directed to the viewer. This can be beneficial, for example, in night operations (as well as in daytime operations) using a wide display where the edges of the display 200 would have increased light illumination due to light from the peripheral region 290. Typically, for a larger display 200, a viewer views the edges of the display 200 at a significantly different angle than the center, where the edge of the display 200 would ordinarily have a reduced brightness. The increased light from the peripheral region compensates for the ordinarily reduced brightness of the edge of the display. This will be discussed in further detail with respect to FIGS. 6-13D.

FIG. 5A is a schematic diagram of a display 500 with a Fresnel lens 525, in accordance with one or more embodiments of the present disclosure. The display 500 may include, but is not limited to, an array of light sources 510, refracting optics 520, a Fresnel lens 525, a diffuser 530, a liquid crystal layer 540, and a controller 550. The substrate 560, light sources 510, refracting optics 520, Fresnel lens 525, and diffuser 530 together make up a backlight 505.

The light sources 510 may be arranged on the substrate 560 to support the light sources 510. The substrate 560 may be, for example, a printed wiring board (PWB). The light sources 510 may be, for example, sources of white light. For example, the light sources 510 may be light emitting diodes (LEDs), or may be other types of white light sources.

The refracting optics 520 may be arranged to receive light from the light sources 510, and to diverge the light received from the light sources 510. The refracting optics 520 may be arranged at a distance from light sources 510 such that the refracting optics 520 partially collimates light from the light sources 510, but the light has some divergence. The collimating optics 520 may include an array of lenses 522. For example, the lenses 522 may be spherical or cylindrical lenses. The lenses 522 may be other than spherical or cylindrical, and may have a surface defined by a function, such as a polynomial. The array of lens 522 may be formed with any material known in the art including, but not limited to, plastic, glass, and the like. The lenses 522 may have a variety of cross-section shapes. For example, lenses 522 may include cross-sections in the shape of a square, rectangle, or the like. The refracting optics 520 may be made of other than an array of lenses and may include refractive or reflective optics.

The Fresnel lens 525 may be arranged to receive the diverged light from the refracting optics 520, and to converge the diverged light to provide converged light with a predetermined size 572 at a focal plane 570 of the display 500. The Fresnel lens 525 may be circularly symmetric about its optical axis, or other than circularly symmetric. For example, the Fresnel lens 525 may be more elliptical with the focal length at the top and bottom being shorter that the left and right focal lengths.

The predetermined size 572 may correspond, for example, to a size of a headbox 574 of a pilot of an aircraft. Thus, the optics of the display 500, including the refracting optics 520 relative to the light sources, and the Fresnel lens 525 direct light toward a predetermined size at the focal plane 570. This arrangement provides viewing privacy for the viewer who has a head positioned within the head box 574.

The liquid crystal layer 540 is arranged such that the converged light from the Fresnel lens 525 passes through the liquid crystal layer 540. The liquid crystal layer 540 may include liquid crystal material, regions of which may be transparent or opaque based on an appropriate voltage being applied to the regions of the liquid crystal material. The liquid crystal layer 540 may further include color filters (not shown) if the display is a color display.

The diffuser 530 may be arranged between the Fresnel lens 525 and the liquid crystal layer 540 such that the converged light from the Fresnel lens 525 passes through and is diffused by the diffuser 530. The diffuser 530 may be a low diffusion diffuser such that light is not significantly scattered beyond what is needed to mask the refracting optics 520 and the light sources 510. A low diffusion diffuser may be, for example, a holographic diffuser. The low diffusion diffuser reduces the amount of light from the light sources 510 which is scattered, and thus reduces the amount of stray light due to light scattering.

Figure 5B:
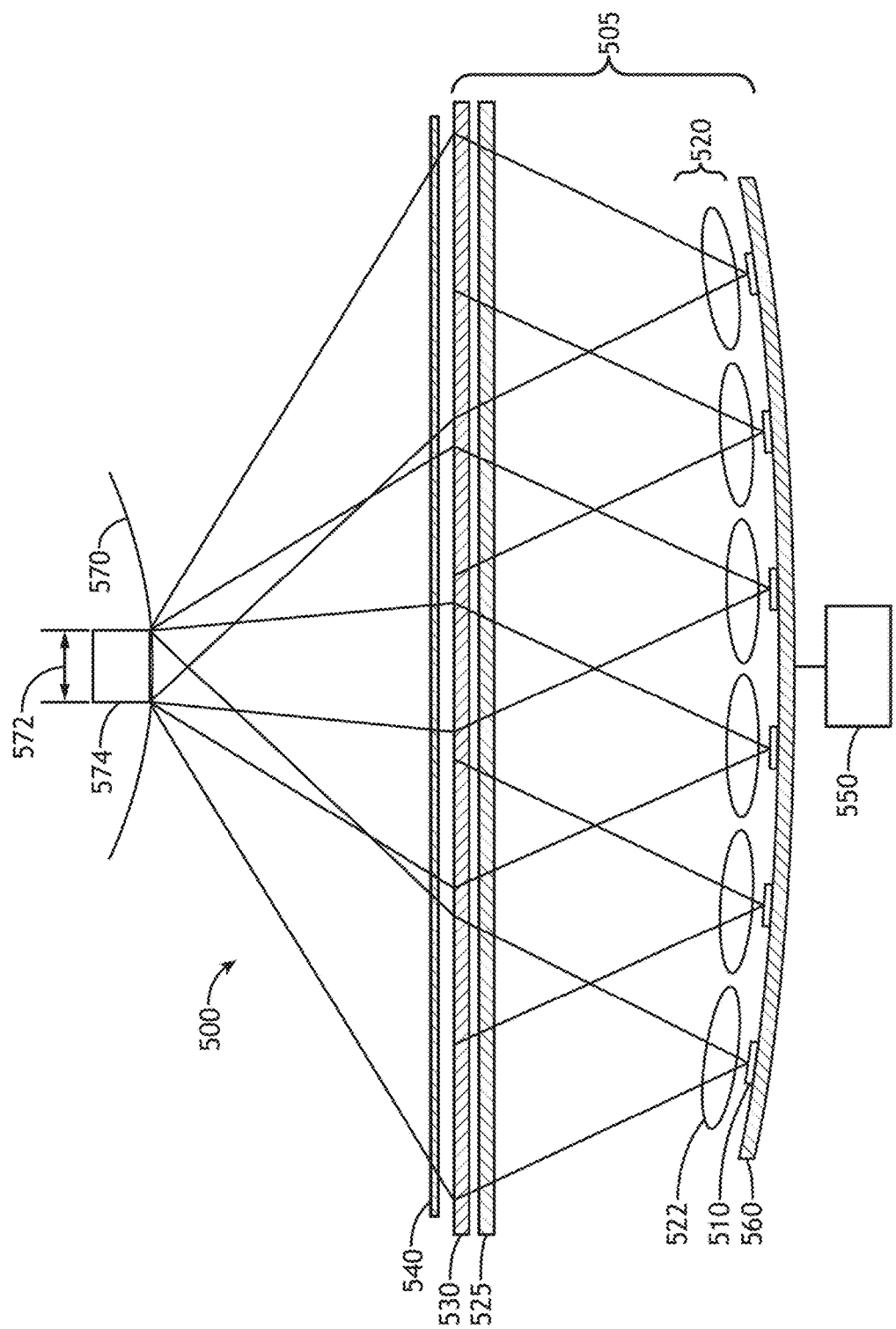
FIG. 5B is a schematic diagram of a display with a Fresnel lens, in accordance with one or more embodiments of the present disclosure.

FIG. 5B is a schematic diagram of a display 500 with a Fresnel lens 525, in accordance with one or more embodiments of the present disclosure. In embodiments, as noted previously herein, one or more components of the backlight 505 may be curved. For example, as shown in FIG. 5B, the backlight 505 may include a curved substrate 560. In some embodiments, the array of light sources 510 may be disposed on the curved substrate 560. Furthermore, in some embodiments, the collimating optics 520 may be curved such that a curve of the collimating optics 520 (e.g., lenses 522) substantially match and correspond to a curve of the curved substrate 560 and light sources 510.

It is noted herein that the relative configuration of the backlight 505 as shown in FIG. 5B is not to be regarded as a limitation on the scope of the present disclosure, unless noted otherwise herein. In this regard, it is contemplated that additional, alternative, and/or fewer components of the backlight 505 may be curved. For example, in additional and/or alternative embodiments, the diffuser 530 of the backlight 505 may also be curved.

Embodiments of the inventive concepts disclosed herein are directed to a display 200, 500 with two groups of light sources 210, 510, a first group of light sources 210a, 510a where the light is collimated and directed normal to a diffuser 230, 530, and a second group of light sources 210b, 510b, where the light is not collimated but directed to the diffuser 230. It is contemplated herein that embodiments of the present disclosure may provide for an increased flexibility in controlling the direction and viewing angular range of the light emitted from the display 200, 500, while at the same time reducing stray light which may lead to reflections. The light from the display 200, 500 may be controlled by controlling which groups of light sources 210, 510 emit light.

In the case that the diffuser 230, 530 is low scattering, and provides some directionality of the light impinging on the diffuser 230, 530, the light may be controlled to reduce light outside the viewing angular range of the display 200, 500 relative to a user, such as an aircraft pilot. The display 200, 500 brightness for a given power applied to the display 200, 500 may be reduced. Thus, power savings is achieved as well as increased display 200, 500 brightness. Further, the display light may be maintained within the viewing angular range, while reducing light outside the viewing angular range.

Moreover, according to embodiments of the inventive concepts disclosed herein regarding an array of light sources 210, 510, corresponding lens array 222, 522, and Fresnel lens 525, light from the display 200, 500 may be converged within a predetermined size to stay within a headbox. This allows for a more tailored headbox. The placement of the Fresnel lens 525 allows for control of light near a liquid crystal layer 240, 540 and does not impact the uniform illumination of the liquid crystal layer 240, 540. In this regard, it is contemplated herein that the inclusion of the Fresnel lens 525 may provide design flexibility.

As noted previously herein, a viewer may view the edges of a display 200, 500 at a significantly different angle than the center of the display 200, 500. Depending on the configuration of optical elements within the display 200, 500, the varying viewing angles at the edges of the display 200, 500 may result in the edges of the display 200, 500 exhibiting a reduced brightness. This issue is exacerbated by increasingly large displays.

Increasing the light produced in a peripheral region of the display 200, 500, as shown and described with respect to FIGS. 4A and 4B, may include one technique for addressing this issue. The increased light from the peripheral region may compensate for the ordinarily reduced brightness of the edge of the display 200, 500. It is further contemplated herein that one or more of the shortfalls of previous approaches, including varying brightness levels and display reflections, may be addressed by curving the backlight of a display (e.g., display 200, 500). Accordingly, additional and/or alternative embodiments of the present disclosure are directed to the use of a curved backlight. This may be further understood with reference to FIGS. 6-6F.

Figure 6A:
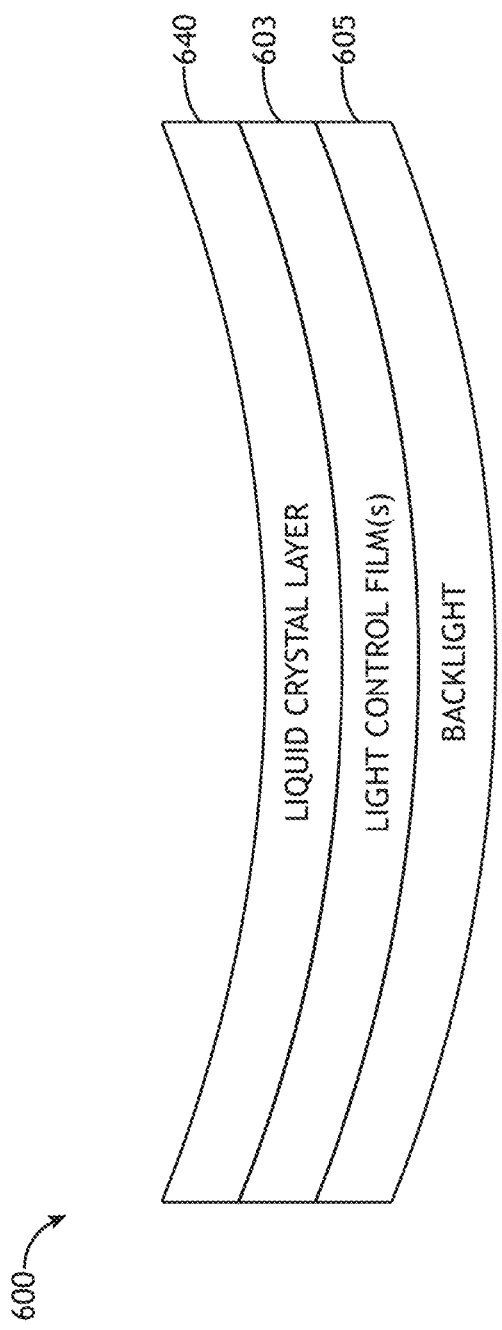
FIG. 6A illustrates a cross-sectional view of a display with a curved backlight, in accordance with one or more embodiments of the present disclosure.

FIG. 6A illustrates a cross-sectional view of a display 600 with a curved backlight 605, in accordance with one or more embodiments of the present disclosure.

In embodiments, the display 600 includes a non-flat (e.g., curved) backlight 605, one or more light control films/layers 603, and a liquid crystal layer 640. It is noted herein that any description associated with the backlights 205, 505 may be regarded as applying to backlight 605. Conversely, any description associated with the backlight 605 may be regarded as applying to backlights 205, 505. In this regard, the curved backlight 605 may include, but is not limited to, a curved substrate, an array of light sources, collimating optics, and a diffuser.

As shown in FIG. 6A, the one or more light control films 603 may be disposed on the curved backlight 605 and may be curved. The one or more light control films 603 may include any light control films/layers known in the art including, but not limited to, privacy films, light redirecting films, and the like. In additional and/or alternative embodiments, the one or more light control layers 603 may be substantially flat/planar. Each of the one or more non-flat light control films 104 may include or be implemented as a micro-louver film. In some implementations, each of the one or more light control films 603 may be affixed to a substrate (e.g., liquid crystal layer 640) on another light control film, or another element of the display 600. The one or more light control films 603 may be implemented as, or included in, one or more light control layers. In some embodiments, at least one of the one or more light control films 603 are implemented as or included within a piecewise light control layer (as described in further detail herein with respect to FIG. 13D). In some embodiments, the liquid crystal layer 640, the one or more light control films 603, and the curved backlight 605 are conformally curved (e.g., having the same curvature shape) such that the one or more light control films 603 can be positioned intimately in front of the curved backlight 605.

Figure 6B:
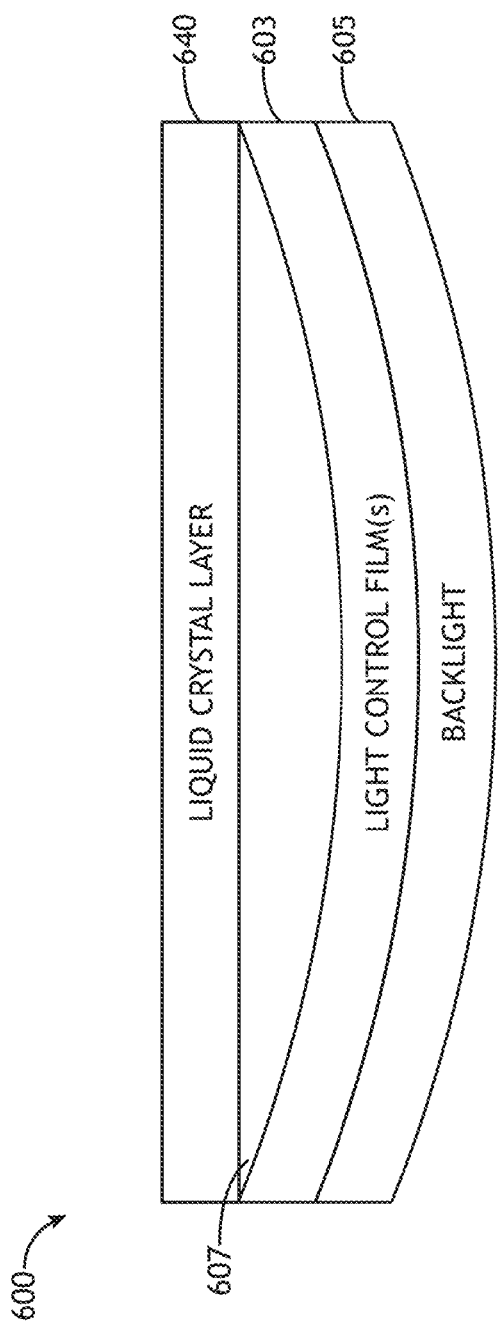
FIG. 6B illustrates a cross-sectional view of a display with a curved backlight, in accordance with one or more embodiments of the present disclosure.

FIG. 6B illustrates a cross-sectional view of a display 600 with a curved backlight 605, in accordance with one or more embodiments of the present disclosure.

In some embodiments, one or more components of display 600 may be curved.

For example, as shown in FIG. 6B, a display 600 may include a curved backlight 605, a curved light control film 603, and a flat/planar liquid crystal layer 640. In embodiments with one or more curved components/layers (e.g., curved backlight 605, curved light control layer 603, and the like) and one or more flat/planar layers (e.g., flat liquid crystal layer 640), the display 600 may include one or more gaps 607. For example, as shown in FIG. 6B, the display 600 may include a gap 607 between the one or more light control films 603 and the liquid crystal layer 640. It is contemplated herein that the one or more gaps 607 may include empty spaces. In additional and/or alternative embodiments, the one or more gaps 607 may be formed from a material which has little/no effect on the performance of the display 600.

Figure 7:
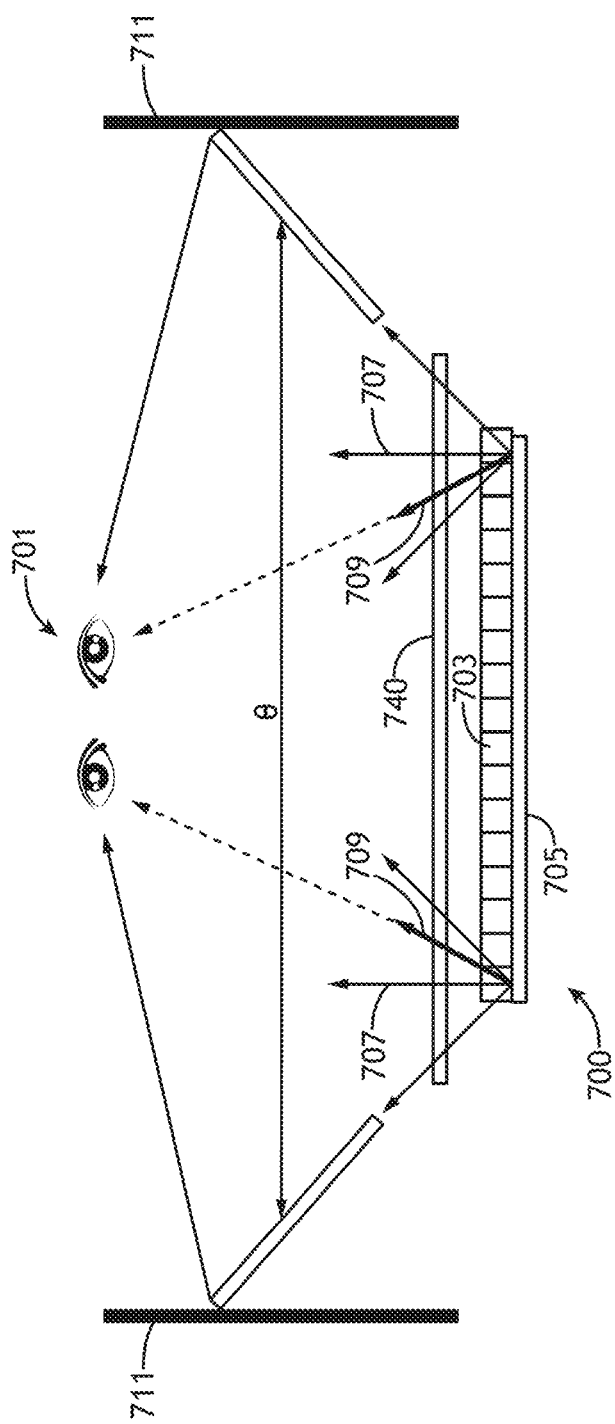
FIG. 7 illustrates a schematic diagram of a display with a flat backlight, in accordance with one or more embodiments of the present disclosure.

FIG. 7 illustrates a schematic diagram of a display 700 with a flat backlight 705, in accordance with one or more embodiments of the present disclosure.

As may be seen in FIG. 7, a viewer 701 viewing the display 700 may view the display 700 at varying angles 8, depending on the portion of the display 700 which is being viewed. For example, a viewer 701 viewing the center of the display 700 may view the display 700 at a first angle, while viewer 701 viewing an edge of the display 700 may view the display 700 at a second angle different from the first angle.

Oftentimes, displays include micro-louver films (e.g., light control films 703) configured to direct light produced by the display 700 such that the display may only be viewed at particular angles. However, micro-louver films (e.g., light control films 703) typically deliver optimal performance only when viewed along a louver axis 707. Additionally, the louver angle, pitch, and thickness of a micro-louver film (e.g., light control film 703) typically does not change across the film. In this regard, while the viewing angle of a viewer 701 may change across portions of the display 700, the louver angle may not change accordingly. This may result in decreased luminance when viewing the edges of the display 700. For example, as shown in FIG. 7, at the edges of the display 700, a viewing angle 709 of the viewer 701 and the louver axis 707 may be offset by an offset angle, resulting in decreased luminance toward the edges of the display 700.

Furthermore, a constant louver axis 707 may result in light being emitted at angles outside the field of view of the viewer 701, which may lead to unwanted reflections. For example, as shown in FIG. 7, the flat backlight 705 with a constant louver axis 707 may emit light at angles outside of the viewer's field of view, which may then reflect off a canopy surface 711 and result in unwanted canopy reflections. In this regard, some embodiments of the present disclosure are directed to using a curved backlight to address one or more of these shortfalls of previous approaches.

Figure 8:
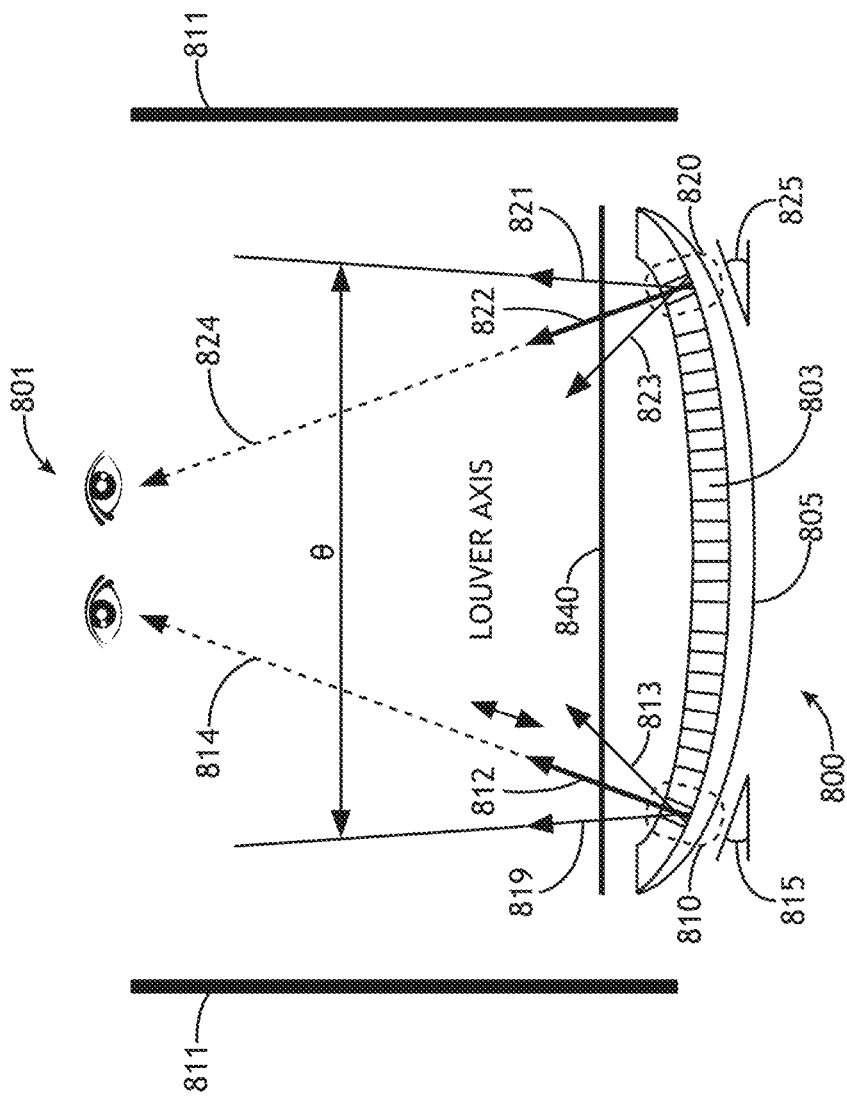
FIG. 8 illustrates a schematic diagram of a display with a curved backlight, in accordance with one or more embodiments of the present disclosure.

FIG. 8 illustrates a schematic diagram of a display 800 with a curved backlight 805, in accordance with one or more embodiments of the present disclosure. In embodiments, display 800 includes a non-flat (e.g., curved, angled, or the like) backlight 805, one or more light control films 803 (e.g., micro-louver film 803) and a liquid crystal layer 840. As noted previously herein with respect to FIGS. 2A, 3, 4A, 5, and 6, the backlight 805 may include, but is not limited to, a substrate, an array of light sources, refracting optics, a diffuser, and the like.

In some embodiments, the display 800 may include a curved backlight 805. Additionally, display 800 may include a curved light control layer/film 803 (such as a uniform or piecewise micro-louver film implemented as or included in a non-flat light control layer). The light control film 803 may be disposed on the curved backlight 805. In this regard, the one or more light control films 803 may be curved. In additional and/or alternative embodiments, the one or more light control films 803 may be substantially flat/planar. In some embodiments, as shown in FIG. 8, the liquid crystal layer 840 may be flat. However, this is not to be regarded as a limitation of the present disclosure, unless noted otherwise herein. In this regard, the liquid crystal layer 840 may be curved without departing from the spirit and scope of the present disclosure. The liquid crystal layer 840 may include any emissive display layer known in the art including, but not limited to, a light-emitting diode (LED) layer, an organic light-emitting diode (OLED) layer, and the like.

In embodiments, the curved backlight 805 may direct a higher proportion of light toward the pilot (e.g., viewer 801) as compared to the flat backlight 705. In this regard, the curved backlight 805 may also be configured to prevent light being directed out of the field of view of the viewer 801 and towards canopy surfaces 811, thereby avoiding unwanted canopy reflections. As will be noted in further detail herein with respect to FIGS. 13A-13D, the curved backlight 805 may be fashioned in a curved, angular, or piecewise fashion in order to generate a tailored luminance profile on the liquid crystal layer 840. Additionally, a desirable luminance profile may be achieved such that the direction of maximum transmittance of the one or more light control films 803 may be aligned with the design eye point of the viewer 801 across all, or a portion, of the display 800.

As shown in FIG. 8, the one or more light control films 803 may include uniform micro-louver film having perpendicularly angled (i.e. angled 90 degrees throughout the light control film) micro-louvers applied to a non-flat backlight 805. In additional and/or alternative embodiments, the micro-louver film may be implemented with non-perpendicular micro-louver angles or as a piecewise micro-louver film, which may or may not include a micro-louver portion including perpendicular micro-louver angles. In some embodiments, the display 800 has a display field which reduces or eliminates the projection of the displayed image on to the canopy surface 811, which improves a pilot's ability to see through the canopy surface 811. Additionally, transmitted light from portions of the screen (e.g., liquid crystal layer 840) of the display 800 with a curved backlight 805 and/or curved light control film 803 may have improved luminance to the pilot across the entire display surface.

In some embodiments, the one or more light control films 803 allow the transmission of light having a predefined angular profile (e.g., based on an angle of curvature 815, 825) of a particular portion (e.g., light control film edge portions 810, 820) of the light control film 803. The predefined angular profile achieved by the one or more light control films 803 may be dependent upon one or more properties of the one or more light control films 803 including, but not limited to, micro-louver angle, micro-louver pitch, micro-louver film thickness, and the like. As such, the light transmitted through the light control layer is restricted at least in part to transmitted light having a most inwardly pointed direction (e.g., toward the central axis of the light control layer, such as in the direction of the most inwardly pointing transmitted light 813, 823) and a most edgewardly pointing direction (e.g., away from a central axis of the light control layer, such as in the direction of the most edgewardly pointing transmitted light 819, 821). For example, as shown in FIG. 8, the light allowed to be transmitted through a first light control film edge portion 810 includes most edgewardly pointing transmitted light 819, louver pointing transmitted light 812 (e.g., light transmitted with a same angle as the louver angle), and most inwardly pointing transmitted light 813; and the light allowed to be transmitted through an opposite light control film edge portion 820 includes most edgewardly pointing transmitted light 821, louver pointing transmitted light 822 (e.g., light transmitted with a same angle as the louver angle), and most inwardly pointing transmitted light 823. In some embodiments, the louver pointing transmitted light 812, 822 is designed to point along a radius (e.g., 814, 824) of curvature between a corresponding portion (e.g., 810, 820) of the light control film 803 and a design eye point.

It is contemplated herein that many optical films (e.g., light control films 803) are designed to exhibit optimal optical performance with light directed normal to the films. In this regard, as shown in FIG. 7, optical films (e.g., light control films 803) may not exhibit heightened optical performance near the edges of a display 700 with a flat backlight 705. In this regard, as shown in FIG. 8, by curving the backlight 805, the backlight 805 may be configured to direct light to the light control film 803 in a substantially normal orientation across the entire light control film 803. Accordingly, it is contemplated herein that a curved backlight 805 may improve the performance of the one or more light control films 803.

It is further contemplated herein that a curved backlight 805 may provide for improved flexibility with a wide array of light control films 804. In previous approaches with flat backlights (e.g., backlight 705), optical films must be biased at particular angles towards the viewer (e.g., viewer 701). For example, privacy films (e.g., light control films 703) may be fabricated with absorptive louvers tilted at an angle. However, the angle required for a given cockpit/flight deck geometry may not be readily available, and fabricating custom light control films 703 may be time-consuming and expensive. Similar shortfalls may be applied to diffusers, prismatic light redirection films (e.g., brightness enhancement films), and lens arrays. These manufacturing limitations limit the ability to tailor luminance profiles across a display for specific applications (e.g., military cockpits, and the like). In this regard, by curving the backlight (e.g., curved backlight 805) the luminance profile may be tailored to fit specific applications using currently and widely available light control films 803.

In some embodiments, a display field of the display 800 may be defined at least in part by a display field angle, θ, which is an angle between a direction of most edgewardly pointing transmitted light 819 through a first edge portion 810 and a direction of most edgewardly pointing transmitted light 821 through an opposite edge portion 820 of the light control film 803 (or display edges).

In some embodiments, a combination of at least (a) an angle of curvature (e.g., 815 or 825) at an edge portion (e.g., 810 or 820) of the curved backlight 805 and/or light control layer 803, and (b) particular micro-louver film properties at the edge portion (e.g., 810 or 820) restricts transmission of edgewardly directed light (e.g., 819 or 821) from passing through the edge portion (e.g., 810 or 820) of the light control layer 803 in excess of a particular designed angle (e.g., one-half of the design field angle, θ, for a non-flat light control layer having a symmetric cross-section) relative to a centerline perpendicularly passing through a center of the light control layer 803. In such embodiments, the display field may be defined with respect to at least one axis by such designed angles at opposite edge portions (e.g., 810, 820) of the light control layer 803. In some embodiments, the designed angle is not more than 35 degrees, not more than 25 degrees, not more than 20 degrees, not more than 10 degrees, not more than 5 degrees, not more than 4 degrees, or the like. Restriction of the transmission of edgewardly directed light from passing through the edge portions (e.g., 810, 820) of the light control layer 803 in excess of a particular designed angle reduces the reflection of light from the display off of nearby surfaces (such as the canopy surface 811).

Figure 9:
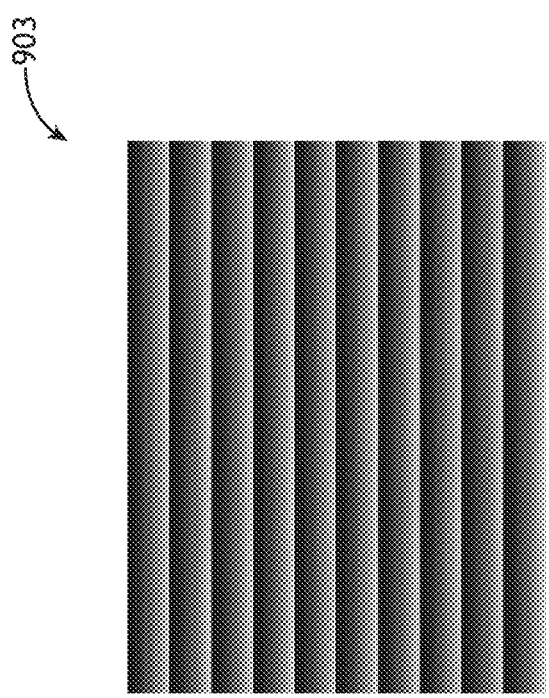
FIG. 9 illustrates a view of a portion of a light control film, in accordance with one or more embodiments of the present disclosure.

FIG. 9 illustrates a view of a portion of a light control film 903, in accordance with one or more embodiments of the present disclosure. In some embodiments, the light control film 903 includes a micro-louver film. The light control film 903 may be configured to constrain light in one direction. Some embodiments may include two or more light control films 903 positioned above or below one another, wherein each of the two or more light control films 903 constrains light in a different direction (e.g., in the horizontal direction, in the vertical direction, or any diagonal direction). In some embodiments, the light control film 903 is implemented as a micro-louver film. In some embodiments, the micro-louver film includes any of various suitable micro-louver film properties (e.g., micro-louver angle, micro-louver pitch, and micro-louver film thickness). In some embodiments, the micro-louver film includes an optical substrate having very fine black louvers spaced at a pitch across the film in the constrained direction. In some embodiments, each of the louvers is positioned within the film at a particular angle (e.g., perpendicular, less than 90 degrees, 85 degrees, 80 degrees, 45 degrees, less than 45 degrees, or the like). In some embodiments, the micro-louver film has any of various suitable film thicknesses. Micro-louver film with a particular combination of micro-louver film properties affects how light is constrained in a particular direction.

Figure 10:
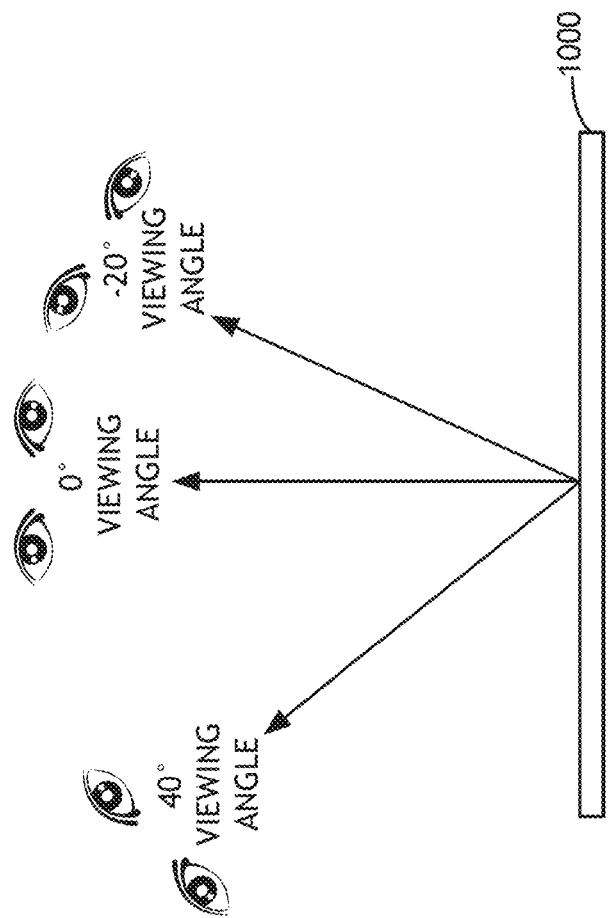
FIG. 10 illustrates a diagram depicting various viewing angles of a display relative to a normal axis of the display, in accordance with one or more embodiments.

FIG. 10 illustrates a diagram depicting various viewing angles of a display 1000 relative to a normal axis of the display 1000, in accordance with one or more embodiments. In particular, FIG. 10 illustrates a 0° viewing angle (e.g., along a normal axis of the display 1000), a 40° viewing angle, and a −20° viewing angle of the present disclosure.

Figure 11C:
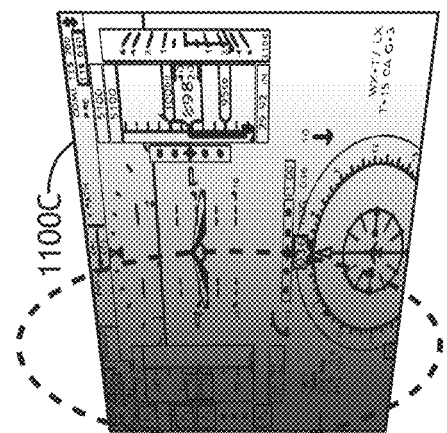
FIGS. 11A-11C illustrate a display with a curved backlight viewed at varying viewing angles, in accordance with one or more embodiments of the present disclosure.
Figure 12C:
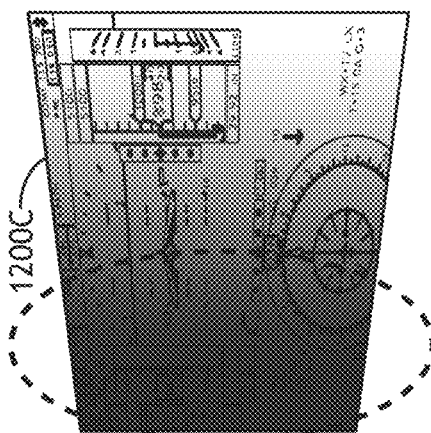
FIGS. 12A-12C illustrate a display with a flat backlight viewed at varying viewing angles.
Figure 11B:
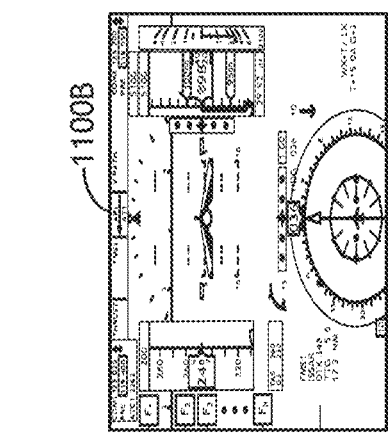
Figure 12B:
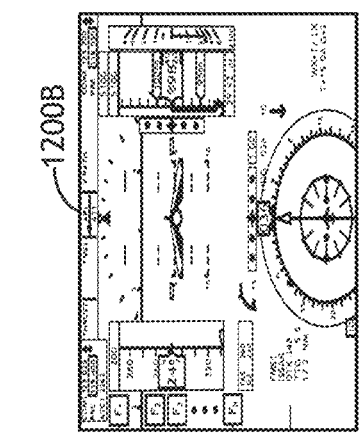
Figure 11A:
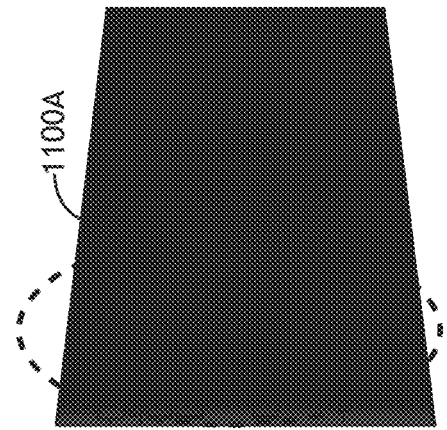
Figure 12A:
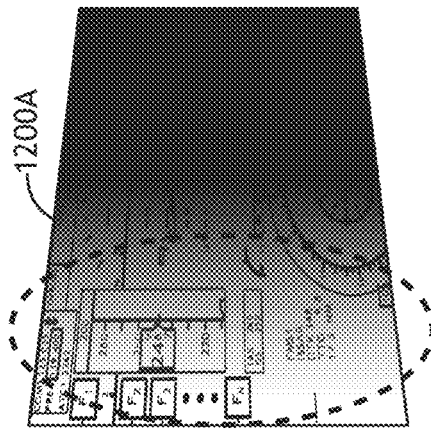

FIGS. 11A-11C illustrate a display 1100 with a curved backlight, in accordance with one or more embodiments of the present disclosure. Comparatively, FIGS. 12A-12C illustrate a display 1200 with a flat backlight. In particular, FIGS. 11A-11C illustrate a display 1100 having a curved backlight as viewed at different viewing angles, as compared to FIGS. 12A-12C, which illustrate a display 1200 having a flat backlight as viewed at the different viewing angles. FIGS. 11A-11C illustrate display assemblies 1100A, 1100B, 1100C implemented with a representative curved backlight and light control layer including a micro-louver film in a curved (with a radius of curvature of approximately 29 inches) configuration.

Referring now to FIG. 11A, a display 1100A having a curved backlight as viewed at an angle of 40 degrees is shown. At 40 degrees, the display assembly 1100A has a very low luminance profile across the entire display assembly 1100A, which demonstrates that there is little stray light and would be little (if any) reflection of a displayed image off a nearby surface at such an angle (as compared to a display 1200A having a flat backlight as shown in FIG. 12A).

Referring now to FIG. 11B, a display 1100B having a curved backlight of a as viewed at an angle of zero degrees is shown. At zero degrees, the display assembly 1100B has a very high luminance profile across the entire display 1100B. Additionally, by comparing FIGS. 11B and 12B, it may be seen that the luminance profile of display 1100B illustrated in FIG. 11B is similar to that of display 1200B illustrated in FIG. 12B.

Referring now to FIG. 11C, a display 1100C having a curved backlight as viewed at an angle of −20 degrees is shown. At −20 degrees the display 1100C has at least a moderate (at the circled left portion) to high luminance profile across the entire display 1100C. At −20 degrees, the display 1100C provides a more uniform luminance gradient than a display assembly 1200C having a flat backlight, as shown in FIG. 12C.

Referring now to FIG. 12A, a display 1200A having a flat backlight as viewed at an angle of 40 degrees is shown. At 40 degrees, the display 1200A has a relatively high luminance on the left side, which demonstrates that there is a significant amount of stray light and would be significant reflection of a displayed image off a nearby surface at such an angle.

Referring now to FIG. 12B, a display 1200B having a flat backlight as viewed at an angle of zero degrees is shown. At zero degrees, the display 1200B has a very high luminance profile across the entire display 1200B. Referring now to FIG. 12C, a display 1200C having a flat backlight as viewed at an angle of −20 degrees is shown. At −20 degrees the display 1200C has a relatively low (at the circled left portion) to high luminance profile across the entire display 1200C. At −20 degrees, the display 1200C has somewhat lower luminance and less uniform luminance gradient than display 1100C having a curved backlight as shown in FIG. 11C.

Comparing FIGS. 11A-11C with FIGS. 12A-12C, it may be demonstrated that displays 1100A, 1100B, 1100C having a curved backlight offer improvements over the displays 1200A, 1200B, 1200C having a flat backlight because the displays 1100A, 1100B, 1100C reduce that amount of stray light at wider viewing angles, and exhibit a more uniform luminance across the entire display at a 20 degree viewing angle.

Referring now to FIGS. 13A-13C, displays 1300 including curved backlights 1305 are depicted. FIG. 13A illustrates a display with a curved backlight having a substantially semicircular curvature cross-section across a horizontal axis, in accordance with one or more embodiments of the present disclosure. FIG. 13B illustrates a display with a curved backlight having a variable (e.g., flared) curvature cross-section along a vertical axis, in accordance with one or more embodiments of the present disclosure. FIG. 13C illustrates a display with a curved backlight having an angled curvature cross-section having one or more substantially straight portions that meet at an angle along a horizontal axis, in accordance with one or more embodiments of the present disclosure.

Figure 13D:
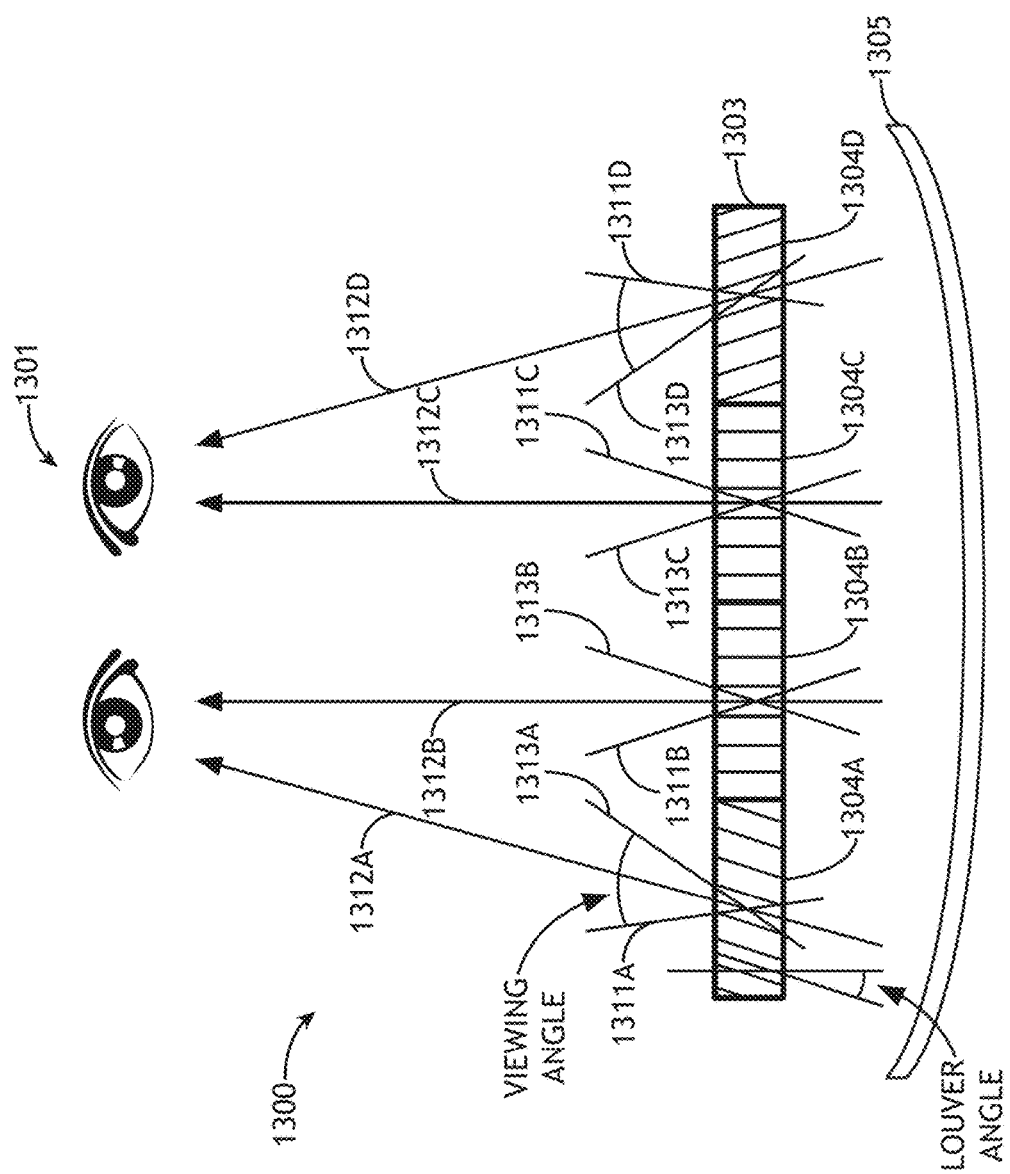
FIG. 13D illustrates a cross-sectional view of a display including a piecewise light control film and a curved backlight, in accordance with one or more embodiments of the present disclosure.

FIG. 13D illustrates a cross-sectional view of a display 1300 including a piecewise light control film 1303 and a curved backlight 1305, in accordance with one or more embodiments of the present disclosure. In some embodiments, the piecewise light control film is implemented as, included in, or affixed to a piecewise light control layer (e.g., a flat or non-flat piecewise light control layer) having a plurality of light control portions. In some embodiments, the piecewise light control film includes a plurality of light control film portions (e.g., 1304A, 1304B, 1304C, 1304D). In some embodiments, each of the plurality of light control film portions (e.g., 1304A, 1304B, 1304C, 1304D) is a micro-louver film portion. In one embodiment, the piecewise light control film includes a plurality of light control film portions (e.g., 1304A, 1304B, 1304C, 1304D) including a first light control film portion 1304A, a second light control film portion 1304B, a third light control film portion 1304C, and a fourth light control film portion 1304D. In one embodiment, the first light control film portion 1304A is configured to restrict light having a first angular profile. In one embodiment, the second light control film portion 1304B is configured to restrict light having a second angular profile. In one embodiment, the third light control film portion 1304C is configured to restrict light having a third angular profile, wherein the third angular profile is the same as the second angular profile. In one embodiment, the fourth light control film portion 1304D is configured to restrict light having a fourth angular profile, wherein the fourth angular profile is different from the first angular profile, the second angular profile, and the third angular profile, and wherein the fourth angular profile is opposite (e.g., reverse angular profile) to the first angular profile.

In some embodiments, each of the light control film portions have a unique set of micro-louver film properties such that each of the light control film portions are configured to restrict light having a different angular profile; however, in other embodiments, only some of the light control film portions have a different set of micro-louver film properties (e.g., micro-louver angle, micro-louver pitch, micro-louver film thickness, or micro-louver orientation) such that some of the light control film portions are configured to restrict light having a different angular profile than other portions of the light control film portions. For example, as shown in FIG. 13D, light control film portions 1304B and 1304C have the same micro-louver film properties including the same micro-louver angle, while the first light control film portion 1304A and the fourth light control film portion 1304D have different micro-louver film properties than the other light control film portions. In some embodiments, the piecewise light control portions are configured across the piecewise light control layer to provide any suitable light distribution across a display assembly. For example, in some embodiments, the piecewise light control portions each have micro louver film properties to angle transmitted light toward a design eye point. For example, as shown in FIG. 13D, light control film portions 1304A, 1304B, 1304C, and 1304D, each include micro-louvers angled to allow the transmission of light toward a design eye point 1301. In some embodiments, piecewise light control layers are configured to reduce stray light and increase luminance viewed across the entire display.

As shown in FIG. 13D, in one embodiment, the light allowed to be transmitted through the first light control film portion 1304A includes most edgewardly pointing transmitted light 1311A, louver pointing transmitted light 1312A (e.g., light transmitted with a same angle as the louver angle), and most inwardly pointing transmitted light 1313A. Additionally, in one embodiment, the light allowed to be transmitted through the second light control film portion 1304B includes most edgewardly pointing transmitted light 1311B, louver pointing transmitted light 1312B (e.g., light transmitted with a same angle as the louver angle), and most inwardly pointing transmitted light 1313B. Also, in one embodiment, the light allowed to be transmitted through the third light control film portion 1304C includes most edgewardly pointing transmitted light 1311C, louver pointing transmitted light 1312C (e.g., light transmitted with a same angle as the louver angle), and most inwardly pointing transmitted light 1313C. Further, in one embodiment, the light allowed to be transmitted through the fourth light control film portion 1304D includes most edgewardly pointing transmitted light 1311D, louver pointing transmitted light 1312D (e.g., light transmitted with a same angle as the louver angle), and most inwardly pointing transmitted light 1313D. In one embodiment, a display field for the piecewise light control film may be defined at least in part by an angle between a direction of the most edgewardly pointing transmitted light (e.g., 1311A) through a first edge film portion (e.g., the first light control film portion 1304A) and a direction of the most edgewardly pointing transmitted light (e.g., 1311D) through an opposite edge film portion (e.g., the fourth light control film portion 1304D).

In some embodiments, the piecewise light control layer includes any suitable configuration or arrangement of piecewise light control portions with each light control portion having any suitable light control properties (e.g., microlouver film properties) for particular design requirements. In some embodiments, the piecewise light control layer includes any suitable number (such as two, three, four, 100, 1000, or more) of piecewise light control portions with each light control portion having any suitable light control properties (e.g., micro-louver film properties) for particular design requirements. In some embodiments, the piecewise light control layer is non-flat, while in other embodiments, the piecewise light control layer is flat.

In some embodiments, the piecewise light control portions are implemented as a plurality of parallel strip-shaped portions which extend from one edge of the light control layer to an opposite end of the light control layer. Additionally, in some embodiments, the parallel strip-shaped portions are uniformly sized, while in other embodiments, the parallel strip-shaped portions are non-uniformly sized. In some embodiments, the piecewise light control portions are implemented as a plurality of uniformly or non-uniformly sized light control tile portions; for example, the piecewise light control portions may be implemented as a plurality of uniformly sized light control tile portions in an m by n grid (e.g., where m and n are positive integers greater than or equal to 2) to form a grid layout (e.g., a grid of 2×2, 3×2, 3×3, 4×2, 4×3, 4×4, . . . 100×100, or more). In some embodiments, the piecewise light control portions are implemented as a plurality of wedge-shaped light control portions arranged radially about a point (e.g., a center point, or otherwise) of the piecewise light control layer. In some embodiments, the piecewise light control layer may be implemented to allow the transmission of any suitable distribution of transmitted light by adjusting the micro-louver film properties of the plurality of piecewise light control portions of the piecewise light control layer.

Additionally, in some embodiments, a display assembly (or other apparatus) may include two or more (e.g., two, three, four, or more) piecewise light control layers positioned one in front of the other (e.g., affixed to each other, affixed to a common substrate, affixed to different substrates or other elements which are abutting or spaced apart, or the like). For example, in some embodiments, a first piecewise light control layer is configured to restrict light along a first axis (e.g. horizontal, vertical, diagonal, or the like), and a second piecewise light control layer is configured to restrict light along a different axis (e.g., an axis orthogonal to the first axis, or otherwise different axis).

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A display comprising:
   a curved backlight including:
      an array of light sources disposed on a curved substrate;
      refracting optics arranged to receive and diverge light from the array of light sources, wherein the refracting optics include collimating optics, wherein the collimating optics include at least one of a spherical lens or a cylindrical lens;

a Fresnel lens arranged to receive the diverged light from the refracting optics and to converge the diverged light to provide converged light within a predetermined size at a focal plane; and a diffuser configured to receive the light from the Fresnel lens and diffuse the light; and a liquid crystal layer configured to receive the light generated by the array of light sources, wherein the liquid crystal layer is configured to transmit the light through the liquid crystal layer to display an image on a surface of the liquid crystal layer.

2. The display of claim 1, further comprising at least one light control layer configured to receive light from the curved backlight and restrict light having an angular profile.

3. The display of claim 2, wherein the at least one light control layer includes at least one micro-louver film portion.

4. The display of claim 1, wherein the refracting optics include an array of lenses corresponding to the array of light sources.

5. The display of claim 1, wherein the array of light sources includes an array of light emitting diodes.

6. The display of claim 1, wherein the diffuser includes a holographic diffuser.

7. The display of claim 1, wherein the substrate includes a printed wiring board.

8. The display of claim 1, wherein the array of light sources includes a first group of light sources, wherein a controller is configured to control the array of light sources such that only the first group of light sources emit light.

9. The display of claim 1, wherein the array of light sources includes a first group of light sources and a second group of light sources, wherein the second group of light sources includes a third group of light sources in a peripheral region of the array and a fourth group of light source in an inner region of the array within the peripheral region wherein a controller is configured to control the array of light sources such that the first group of light sources and the third group of light sources emit light, but not the fourth group of light sources.

* * * * *